(12) United States Patent
Ishida et al.

(10) Patent No.: US 11,910,095 B2
(45) Date of Patent: Feb. 20, 2024

(54) INCIDENT LIGHT INFORMATION ACQUISITION METHOD, INCIDENT LIGHT INFORMATION ACQUISITION SYSTEM, AND INFORMATION PROCESSING DEVICE

(71) Applicant: Sony Interactive Entertainment Inc., Tokyo (JP)

(72) Inventors: Takayuki Ishida, Tokyo (JP); Shinya Wada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 113 days.

(21) Appl. No.: 17/775,998

(22) PCT Filed: Nov. 21, 2019

(86) PCT No.: PCT/JP2019/045648
§ 371 (c)(1),
(2) Date: Jun. 2, 2022

(87) PCT Pub. No.: WO2021/100177
PCT Pub. Date: May 27, 2021

(65) Prior Publication Data
US 2022/0394165 A1 Dec. 8, 2022

(51) Int. Cl.
*H04N 23/71* (2023.01)
*G01B 11/24* (2006.01)
(Continued)

(52) U.S. Cl.
CPC ............ *H04N 23/71* (2023.01); *G01B 11/24* (2013.01); *G01N 21/55* (2013.01); *G02F 1/137* (2013.01);
(Continued)

(58) Field of Classification Search
CPC ........ H04N 23/71; H04N 23/56; H04N 23/72; H04N 23/60; G01B 11/24; G01N 21/55;
(Continued)

(56) References Cited

U.S. PATENT DOCUMENTS 9,449,428 B2 9/2016 Gautron
10,609,286 B2 * 3/2020 Hold-Geoffroy .... G06V 10/764
(Continued)

FOREIGN PATENT DOCUMENTS

EP 0999518 A1 5/2000
JP 2007018173 A 1/2007
JP 2013515307 A 5/2013

OTHER PUBLICATIONS

International Search Report for corresponding PCT Application No. PCT/JP2019/045648, 4 pages, dated Feb. 18, 2020.

*Primary Examiner* — Timothy J Henn
(74) *Attorney, Agent, or Firm* — Matthew B. Dernier, Esq.

(57) ABSTRACT

In an information processing apparatus, a captured image acquiring section acquires data of an image captured of a reference object while part of incident light applied thereto is being blocked. An incident light information acquiring section acquires, according to a predetermined model equation, a brightness distribution of partial incident light in each of light-blocked states on the basis of the image of the reference object, and acquires a brightness distribution of overall incident light by calculating brightness distributions of partial incident light. A target information acquiring section acquires the shape and material of a target by using the brightness distribution of overall incident light.

15 Claims, 7 Drawing Sheets

(51) Int. Cl.
*G01N 21/55* (2014.01)
*G02F 1/137* (2006.01)
*H04N 23/56* (2023.01)
*H04N 23/72* (2023.01)
*G06T 7/00* (2017.01)

(52) U.S. Cl.
CPC ............... *G06T 7/97* (2017.01); *H04N 23/56* (2023.01); *H04N 23/72* (2023.01); *G06T 2207/10152* (2013.01)

(58) Field of Classification Search
CPC . G02F 1/137; G06T 7/97; G06T 2207/10152; G01J 1/00; G01J 1/42
See application file for complete search history.

(56) References Cited

U.S. PATENT DOCUMENTS

| | | | |
|---|---|---|---|
| 2010/0134516 A1 | 6/2010 | Cooper | |
| 2011/0063295 A1 | 3/2011 | Kuo | |
| 2012/0256923 A1 | 10/2012 | Gautron | |
| 2019/0373704 A1* | 12/2019 | Cristiani | H05B 47/125 |
| 2021/0027526 A1* | 1/2021 | Dong | G06T 15/506 |
| 2021/0166437 A1* | 6/2021 | LeGendre | G06T 19/20 |
| 2023/0019751 A1* | 1/2023 | Ha | G06T 15/60 |
| 2023/0260207 A1* | 8/2023 | Robert | G06T 19/006 |
| | | | 345/426 |

* cited by examiner (a)  (b)

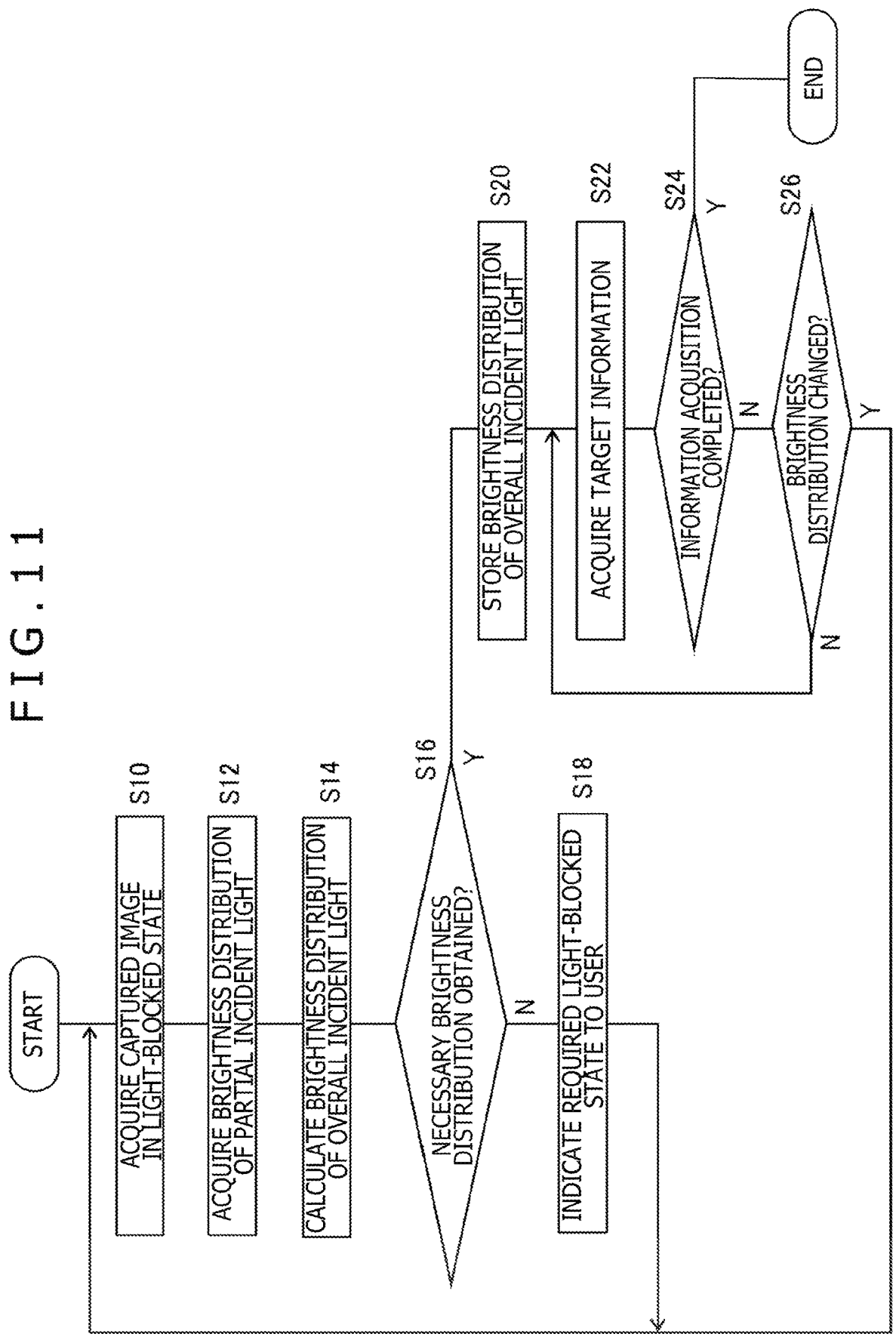

INCIDENT LIGHT INFORMATION ACQUISITION METHOD, INCIDENT LIGHT INFORMATION ACQUISITION SYSTEM, AND INFORMATION PROCESSING DEVICE

TECHNICAL FIELD

The present invention relates to an incident light information acquiring method for use in acquiring information of a target object by using a captured image, an incident light information acquiring system that carries out the incident light information acquiring method, and an information processing apparatus.

BACKGROUND ART

There is known a game using a displayed image that is generated by capturing an image of a part of a body such as a user's head with a video camera, extracting certain regions of the body such as eyes, a mouth, or hands from the captured image, and replacing them with other images (see, for example, PTL 1). There is also known a user interface system that interprets a motion of a mouth or a hand whose image has been captured by a video camera as an operation command in an application. The technology for thus capturing an image of a real world and displaying a virtual world that reflects the existence of a real object or its motion on the basis of the captured image or using the captured image for some information processing has been used in a wide range of fields at various scales from small-size mobile terminals to leisure facilities.

CITATION LIST

Patent Literature

[PTL 1] European Published Patent Application No. 0999518

SUMMARY

Technical Problems

The technology that acquires the shape and material of a real object on the basis of a captured image thereof and takes its three-dimensional model into a virtual world or performs information processing on the acquired data is disadvantageous in that the accuracy of the processing tends to become unstable due to the environment in which the image is captured. For example, if objects in the captured image vary owing to illumination and natural light in the surroundings, then the results of an image analysis can greatly be affected. In order to acquire information of a real object with high accuracy, for example, the place where its image is to be captured may be limited to a studio where the illumination environment is controlled in a rigorous manner or it may be required to capture its image after the intensity of light has been measured in all directions. Such a practice is problematic in terms of versatility and easiness.

The present invention has been made in view of the above drawbacks. It is an object of the present invention to provide a technology that is capable of making highly accurate with ease the acquisition of information of a target object with use of a captured image.

Solution to Problems

An aspect of the present invention relates to an incident light information acquiring method. The incident light information acquiring method includes a step of acquiring an image captured of a reference object whose shape and material are known while part of incident light applied thereto is being blocked, a step of acquiring, according to a predetermined model equation, a brightness distribution of partial incident light produced by blocking part of the incident light, on the basis of the image of the reference object in each of a plurality of images captured when the incident light is blocked in different directions, and a step of acquiring a brightness distribution of overall incident light by calculating brightness distributions of partial incident light.

Another aspect of the present invention relates to an incident light information acquiring system. The incident light information acquiring system includes a reference object whose shape and material are known, an image capturing device that captures an image of the reference object while part of incident light applied thereto is being blocked, and an information processing apparatus that acquires a brightness distribution of incident light by using the captured image. The information processing apparatus includes a partial incident light information acquiring section that acquires, according to a predetermined model equation, a brightness distribution of partial incident light produced by blocking part of the incident light, on the basis of the image of the reference object in each of a plurality of images captured when the incident light is blocked in different directions, and an overall incident light information acquiring section that acquires a brightness distribution of overall incident light by calculating brightness distributions of partial incident light.

Still another aspect of the present invention relates to an information processing apparatus. The information processing apparatus includes a captured image acquiring section that acquires an image captured of a reference object whose shape and material are known while part of incident light applied thereto is being blocked, a partial incident light information acquiring section that acquires, according to a predetermined model equation, a brightness distribution of partial incident light produced by blocking part of the incident light, on the basis of the image of the reference object in each of a plurality of images captured when the incident light is blocked in different directions, and an overall incident light information acquiring section that acquires a brightness distribution of overall incident light by calculating brightness distributions of partial incident light.

Any combinations of the components described above and representations of the present invention as they are converted between methods, apparatuses, and the like are also effective as aspects of the present invention.

Advantageous Effect of Invention

According to the present invention, it is possible to make highly accurate with ease the acquisition of information of a target object with use of a captured image.

BRIEF DESCRIPTION OF DRAWINGS

FIG. 11 is a flowchart illustrating a processing sequence in which the information processing apparatus acquires a brightness distribution of incident light according to the embodiment.

DESCRIPTION OF EMBODIMENT

Figure 1:
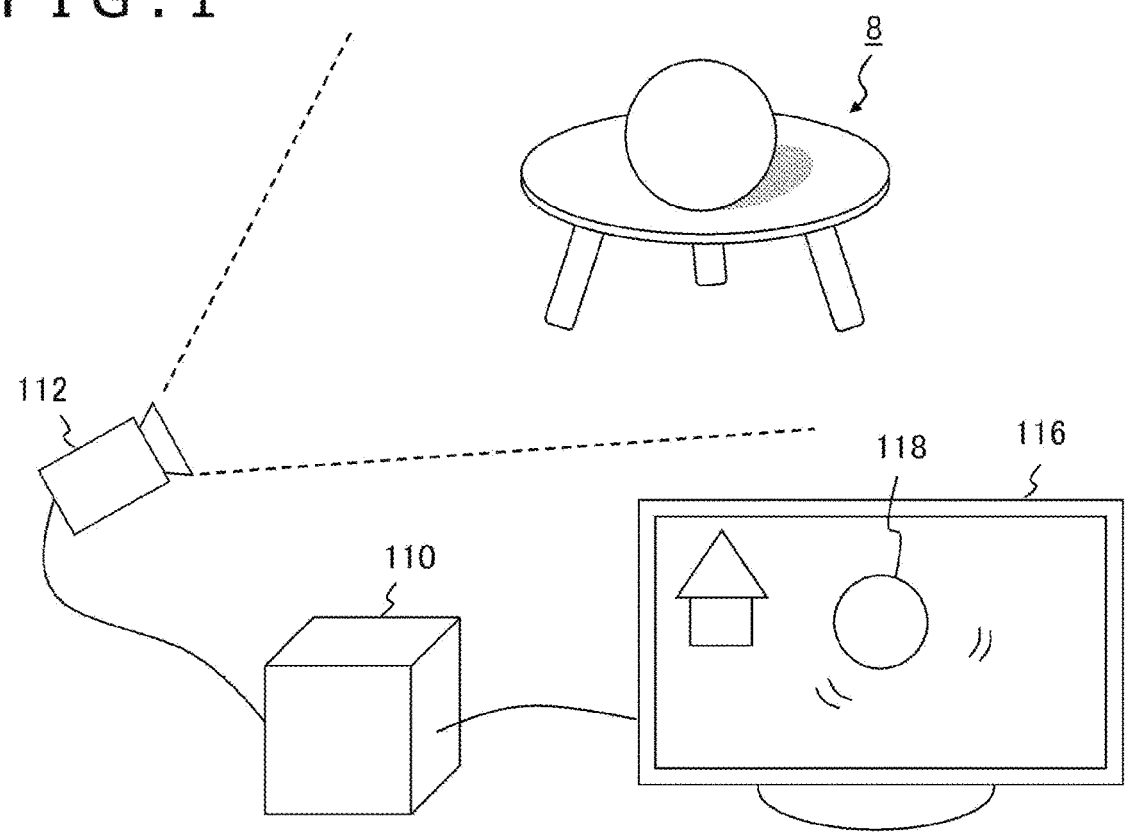
FIG. 1 is a diagram illustrating a configurational example of an information processing system according to an embodiment of the present invention.

FIG. 1 illustrates a configurational example of an information processing system according to an embodiment of the present invention. The information processing system includes an image capturing device 112 for capturing an image of a subject 8 at a predetermined frame rate, an information processing apparatus 110 for acquiring the data of the captured image and performing a predetermined information processing procedure on the acquired image data, and a display device 116 for outputting the results of the information processing procedure. The information processing system may further include an input device for accepting operating actions on the information processing apparatus 110 from its user. The information processing apparatus 110 may be able to communicate with an external apparatus such as a server by connecting to a network such as the Internet.

The information processing apparatus 110, the image capturing device 112, and the display device 116 may be interconnected in a wired set-up by cables or may be wirelessly interconnected by a wireless local area network (LAN) or the like. Two or more of the information processing apparatus 110, the image capturing device 112, and the display device 116 may be combined together into a unitary apparatus. For example, an information processing system may be realized by a camera, a mobile terminal, or the like that incorporates those components. Alternatively, the display device 116 may be mounted on the head of the user as a head-mounted display for displaying images before the eyes of the user, and the head-mounted display may incorporate the image capturing device 112 for capturing images on the line of sight of the user. At any rate, the information processing apparatus 110, the image capturing device 112, and the display device 116 are not limited to the illustrated appearances.

In the information processing system, the information processing apparatus 110 acquires at least the data of an image of the subject 8 captured by the image capturing device 112, and analyzes the image data to acquire subject information representing the three-dimensional shape and material of the subject 8. Then, the information processing apparatus 110 performs information processing on the acquired subject information. For example, the information processing apparatus 110 recognizes the subject on the basis of the subject information and tracks the motion of the subject. Alternatively, the information processing apparatus 110 plots a virtual world in which the subject appears and outputs the data of the plotted virtual world to the display device 116.

In the illustrated example, an object 118 that simulates a spherical body in the subject 8 is plotted in the virtual world. The content and purpose of a plotted image is not limited to anything particular. For example, the information processing apparatus 110 may generate an image to appreciate, such as a movie where an object simulating a real thing appears, or may realize a game where the user moves a real thing and an object simulating the real thing moves in unison to fight against an enemy object. In such a mode, providing the shape and material of a real thing has been acquired accurately, a more realistic expression is made possible as if the real thing came into the screen.

However, the information processing apparatus 110 may not only blend a real thing into an image world, but also perform information processing in response to the motion of a real thing or display an image where a real thing is replaced with another virtual object. In this case, too, providing the shape and material of a real thing has been acquired accurately, it can be tracked in motion and can be distinguished from other things highly accurately. The subject 8 may be a living body such as a human face or hand. In such a case, the information processing apparatus 110 is able to recognize the motion of a human face or hand that has entered the field of vision of the image capturing device 112 or to display a computer graphics object that is a faithful reproduction of a human being on the display device 116.

Various processes for acquiring the shape and material of a subject from a captured image have been proposed for use with the system illustrated in FIG. 1. One of the proposed processes that has been widely known in the art is inverse rendering for solving the inverse problem of a rendering equation that is generally used in computer graphics rendering. According to general computer graphics, an object with reflective characteristics set thereon is placed in a world coordinate system, and a light source and camera coordinate system is set to calculate a brightness distribution of light from the surface of the object. The brightness $L_o(r_o, \omega_o)$ of light radiating in a direction $\omega_o$ at a position $x_o$ on the surface of the object is determined according to the following rendering equation.

[Math. 1] $L_o(x_o, \omega_o) = \int_A \int_{2\pi} S(x_i, \omega_i; x_o, \omega_o)$ $L_i(x_i, \omega_i)(\vec{n}, \vec{\omega_i}) d\omega_i dA(x_i)$                         Equation (1)

Here, the function S is a bidirectional scattering-surface reflectance distribution function (BSSRDF) and represents the ratio of light applied with brightness $L_i$ from a direction $\omega_i$ at a position $x_i$ to light emitted in the direction $\omega_o$ at the position $x_o$, including light scattered below the object surface. The vector n indicates a line normal to the surface of the object, and A the range affected by the light scattered below the object surface. In other words, the function S depends on the material of the object, and the vector n depends on the shape of the object.

Consequently, the brightness distribution $L_o(\omega_o)$ of the emitted light at each position $x_o$ on the object surface is obtained by determining the function S and the vector n on the basis of the settings of the material and shape of the object to be plotted and giving the brightness distribution $L_i(x_i,\omega_i)$ of the incident light. Of the emitted light, the brightness of light applied to a view screen depending on the viewpoint is calculated, so that the object can be plotted that reflects the effect of the material of the object and the ambient light. Using this relation, inverse rendering determines either of the parameters included in the right side of the equation by giving to the left side of the equation the brightness value of the image of the subject that is represented by the captured image.

Generally, images of a subject are captured from multiple directions, and a plurality of equations (1) are established, so that parameters are estimated so as to satisfy the equations simultaneously. The more the known parameters are, the higher the accuracy with which to estimate unknown parameters is. It may be considered to make the brightness distribution $L_i(x_i,\omega_i)$ of the incident light known in order to obtain the shape and material of a subject accurately, for example. In the general environment, however, windows and illuminations are available in various layouts, numbers, and the brightness of light from those light sources ranges in various levels, so that it is difficult to specify all of them.

It may be considered as an initialization process to direct the image capturing device 112 toward a wall and a ceiling and capture their images with the image capturing device 112 in order to specify information of them, but such a process would require a large expenditure of labor. Specifically, the image capturing device 112 would need to be accurately positioned in order to allow items of information individually obtained from a plurality of images to be represented in a unified coordinate system. Furthermore, work would be required to capture omnidirectional images or interpolate images captured at intervals, for example. On the other hand, it may be considered to capture an image of an object whose shape and material is known and acquire a brightness distribution $L_i(x_i,\omega_i)$ of incident light by way of inverse rendering.

However, the degree of freedom of the brightness distribution $L_i(x_i,\omega_i)$ itself would be excessively high, a number of images would need to be captured, and it would be highly possible to end up in an ill-established problem where no solution would be found to satisfy all the equations established for the respective images. According to the present embodiment, an image of a reference object whose shape and material is known is captured while part of incident light is blocked, and a brightness distribution of the partial incident light is acquired by way of inverse rendering. Since the brightness distribution thus acquired has at least the directions $\omega_i$ limited, it is easier to find a solution with fewer equations. This process is repeated for different light blocking directions, and the obtained items of information are combined to acquire a brightness distribution of incident light applied to a subject space where no light is blocked.

Figure 2:
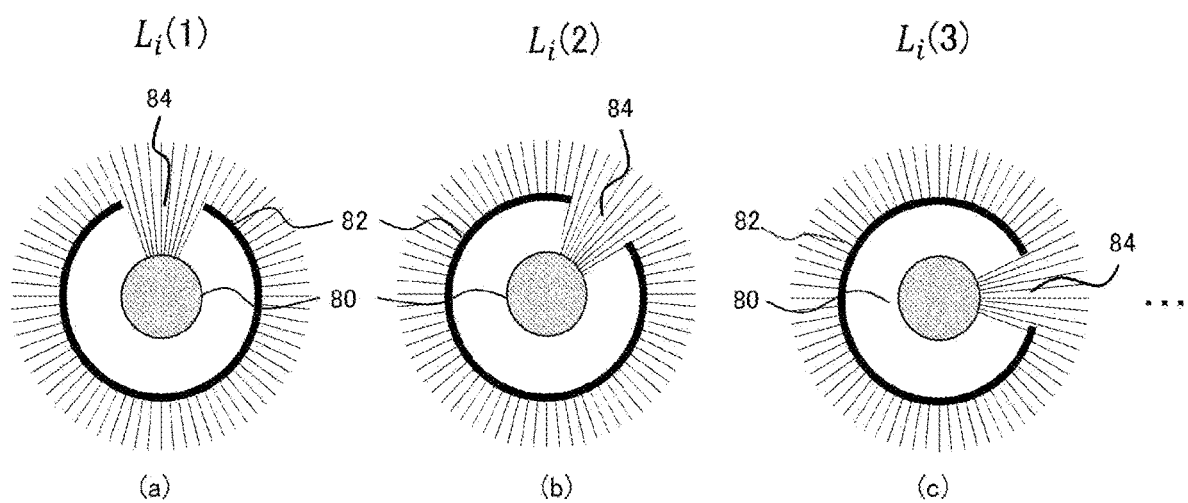
FIG. 2 is a diagram illustrating principles of acquisition of a brightness distribution of incident light according to the embodiment.

FIG. 2 is a diagram illustrating principles of the acquisition of a brightness distribution of incident light according to the embodiment. FIG. 2 illustrates in cross section a reference object 80 shaped as a spherical solid body that is present in an internal space in a light blocking object 82 shaped as a spherical surface in each of states (a), (b), and (c). Incident light applied to the reference object 80 is schematically indicated by radial lines. The light blocking object 82 is provided as a spherical surface made of a light-impermeable material or having a light-impermeable color and has a positionally variable light inlet 84 defined partly in the spherical surface. The "light inlet" refers to a light entrance that may be an opening defined in the spherical surface or a transparent portion of the spherical surface that allows light to go therethrough.

Part of the incident light is applied through the light inlet 84 of the light blocking object 82 to the reference object 80. In principle, when only incident light applied through a solid angle subtended by the light inlet 84 is taken into account in the equation (1), the brightness of an image of the reference object 80 as observed under the circumstances is obtained. In other words, the following equation is satisfied.

[Math. 2] $L_o(N)=\int_A \int_{2\pi} S \cdot L_i(N) \cdot (\vec{n}, \vec{\omega_t}) d\omega_i dA$  Equation (2)

Here, N=1, 2, 3, . . . represents a suffix that is a natural number for identifying the position of the light inlet 84. Variables that give the function S and the brightness distributions $L_o$ and $L_i$ in the equation (1) are omitted from the equation (2). Providing the state (a) in FIG. 2 is indicated by N=1, for example, the brightness distribution $L_i(1)$ of incident light applied to the reference object 80 is related to the brightness distribution $L_o(1)$ of light emitted from the reference object 80 by the equation (2). Providing the state (b) in FIG. 2 where the light inlet 84 is in a different position is indicated by N=2, the brightness distribution $L_i(2)$ of incident light applied to the reference object 80 is related to the brightness distribution $L_o(2)$ of light emitted from the reference object 80 by the equation (2).

Similarly, with respect to the state (c) in FIG. 2, the brightness distribution $L_i(3)$ of incident light applied to the reference object 80 and the brightness distribution $L_o(3)$ of light emitted from the reference object 80 satisfy the equation (2). A brightness distribution $L_o(N)$ of light emitted from the reference object 80 in states (hereinafter referred to as "light-blocked states") where the light inlet 84 faces in different directions can be acquired from the posture of the image capturing device and the brightness of an image in captured images. A brightness distribution $L_i(N)$ of incident light applied to the reference object 80 is determined in the light-blocked states by substituting the acquired value in the left side of the equation (2).

Actually, as indicated by the equation given below, incident light $L_i(N)$ is adjusted to minimize the difference between a brightness distribution $L_o(N)_{sim}$ of emitted light that is calculated from an assumed brightness distribution $L_i(N)$ of incident light and a brightness distribution $L_o(N)_{obs}$ of emitted light that is actually observed, thereby obtaining a final solution.

[Math. 3] $L_i(N)=\mathrm{argmin}_{L_i}(Err(L_o(N)_{obs}-L_o(N)_{sim}))$  Equation (3)

Here, "argmin" indicates an adjusting process for minimizing the numerical value in the parentheses, and "Err" indicates the difference between the distributions in the parentheses. The calculation makes it possible to obtain a brightness distribution of incident light applied to the reference object 80 in each light-blocked state. In principle, the light inlet 84 is placed successively in all directions without overlapping itself and a brightness distribution of incident light is obtained in each position, so that an original distribution of incident light in the absence of the light blocking object 82 is obtained as follows.

[Math. 4] $L_{i(x_i,\omega_i)}=\Sigma_N L_i(N)$  Equation (4)

Figure 3:
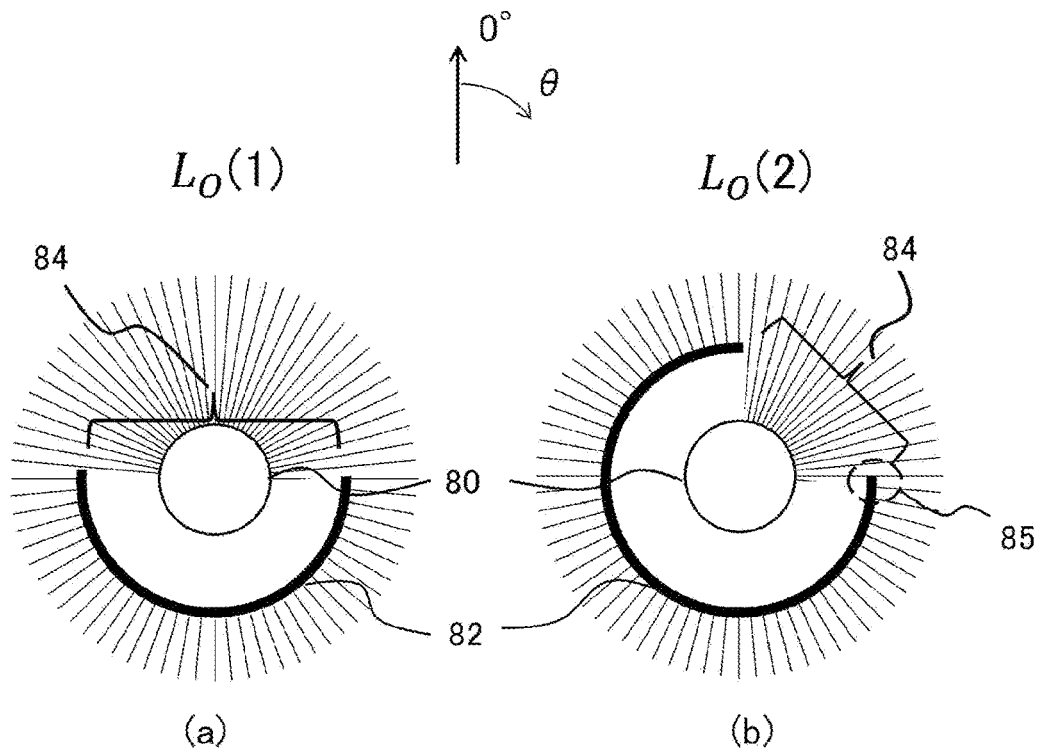
FIG. 3 is a diagram illustrating from another standpoint the principles of the acquisition of a brightness distribution of incident light according to the embodiment.

FIG. 3 is a diagram illustrating from another standpoint the principles of the acquisition of a brightness distribution of incident light according to the present embodiment. FIG. 3 depicts the components in the same way as FIG. 2. When an angle θ is defined as a space measured clockwise from an upward direction at 0° in FIG. 3, as indicated in an upper section of FIG. 3, the light inlet 84 of the light blocking object 82 has an angular range of −90°≤θ<90° in the state (a) and an angular range of 0°≤θ<90° in the state (b). The angular range actually represents a solid angle.

An observation of the brightness distributions $L_o(1)$ and $L_o(2)$ of light emitted from the reference object 80 in the respective states indicates that the overall brightness value is higher with the state (a) where the light inlet 84 is wider. The difference $L_o(1)-L_o(2)$ represents a contribution of the incident light in the angular range −90°≤θ<0° that is blocked in the state (b). By introducing the difference as an observed value into the equation (3), a brightness distribution of the incident light in the angular range −90°≤θ<0° can be acquired without capturing an image of the state where the light inlet 84 is positioned in the angular range −90°≤θ<0°.

The brightness distribution of the incident light in the angular range 0°≤θ<90° is determined by $L_o(2)$ in the same manner as described above with reference to FIG. 2. According to the present embodiment, as described above, a brightness distribution of incident light applied to a subject space is basically acquired by calculating brightness distributions of partial incident light in respective light-blocked states that are obtained by capturing images of the reference object 80 while incident light is being partly blocked. The model representing the relation between a brightness distribution of incident light and a brightness distribution of emitted light is not limited to the equation (1), and any of various proposed models may be employed in the present embodiment.

According to the present embodiment, the accuracy of a brightness distribution of incident light can be increased by including in the model equation a diffractive phenomenon at an edge of the light inlet 84 of the light blocking object 82, e.g., an edge 85 in FIG. 3, and multiple reflections on outer and inner surfaces of the light blocking object. The effect of multiple reflections may be reduced by making the light blocking object 82 of a material having high light absorptivity or coloring the light blocking object 82 with a color having high light absorptivity. In FIGS. 2 and 3, the reference object 80 is shaped as a spherical solid body and the light blocking object 82 as a spherical surface. However, the reference object 80 and the light blocking object 82 are not limited to any particular shapes. The light blocking object 82 further has an opening for observing or capturing an image of the reference object 80, or an image capturing sensor is provided on an inner surface of the light blocking object 82.

Figure 4:
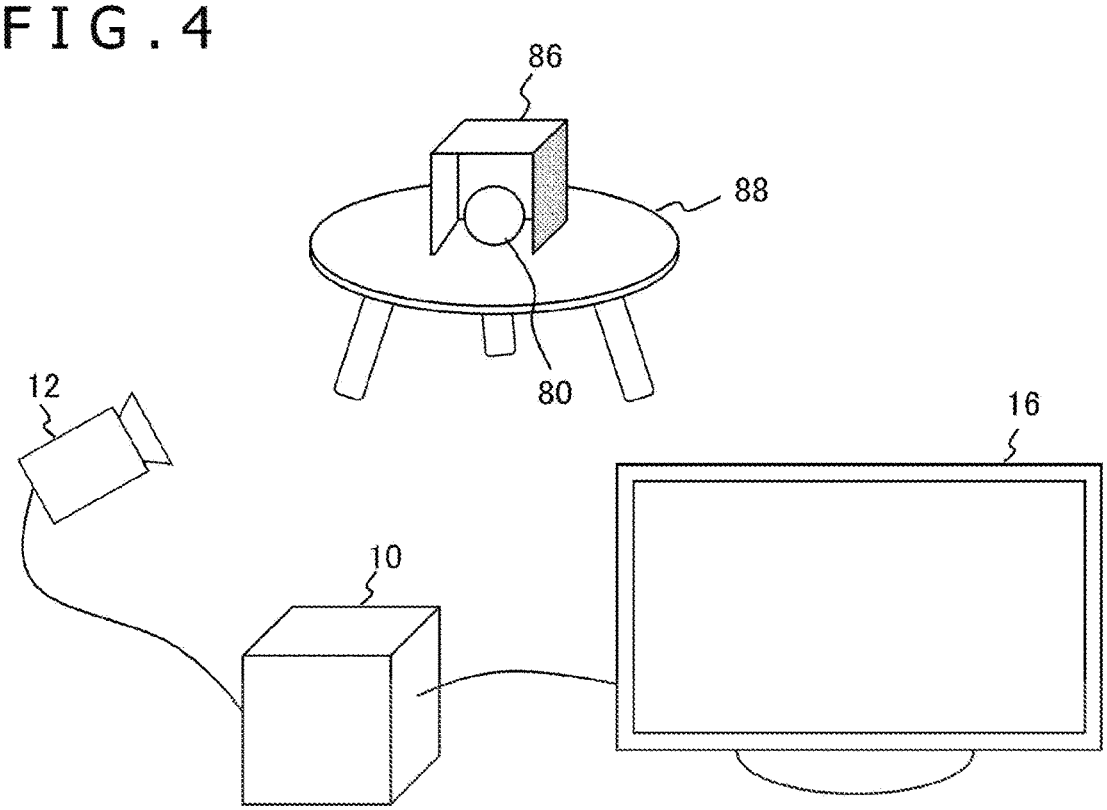
FIG. 4 is a diagram illustrating a configurational example of an incident light information acquiring system according to the embodiment.

FIG. 4 illustrates a configurational example of an incident light information acquiring system according to the present embodiment. The incident light information acquiring system includes an image capturing device 12 for capturing an image of a reference object 80 and a light blocking object 86, an information processing apparatus 10 for acquiring information of a brightness distribution of incident light with use of the captured image, and a display device 16 for indicating a required light-blocked state to the user. The image capturing device 12 and the display device 16 may be identical to the image capturing device 112 and the display device 116, respectively, illustrated in FIG. 1. The information processing apparatus 10 may be part of the information processing apparatus 110 illustrated in FIG. 1.

The image capturing device 12 is a general camera having a charge-coupled device (CCD) image sensor, a complementary metal oxide semiconductor (CMOS) image sensor, or the like. Alternatively, the image capturing device 12 may be a polarization camera including a polarizer disposed on a front surface of a lens or in an image-capturing element. In this case, when polarized images are captured in a plurality of directions, brightness distributions of emitted light are obtained for the respective polarizing directions. Since brightness distributions of incident light are obtained for the respective polarizing directions from equations established for the respective brightness distributions, the obtained brightness distributions of incident light are added to obtain a brightness distribution of non-polarized incident light. By thus separating polarized components and finding solutions with respect to them, the accuracy of a finally acquired brightness distribution of incident light is increased.

In the example illustrated in FIG. 4, the reference object 80 is shaped as a spherical solid body as in the case of FIG. 2 and FIG. 3, but the light blocking object 86 is shaped as a cubic surface that is open or does not block light in one facet facing the image capturing device 12. In this example, it is assumed that a target whose shape and material is to be acquired when the system is in operation is placed on a table. The reference object 80 and the light blocking object 86 are placed on a table 88. Therefore, light reflected from the table 88 is used as incident light, and its brightness distribution can similarly be acquired. In order to include the light reflected from the table 88 in the model equation, information regarding the material and color of the table 88 is stored in advance in a reference information storing section 52.

If such information is not known, then an incident light information acquiring section 54 may acquire the information on the spot. For example, an isotropic light source or a light source with similar characteristics may be mounted on an inner wall surface of the light blocking object 86, and the information processing apparatus 10 controls the light source to switch between its turned-on and turned-off states. Alternatively, a plurality of light sources may be mounted in different positions on the inner wall surface of the light blocking object 86, and the information processing apparatus 10 may selectively turn on the light sources. The incident light information acquiring section 54 acquires a brightness distribution of light emitted from the table 88 on the basis of an image captured of the light blocking object 86 in the absence of the reference object 80. Since a brightness distribution of incident light is already known, reflectance characteristics of the table 88 can be obtained in the same manner as when information of a target is obtained.

The surface on which the light blocking object 86 and the reference object 80 are placed is not limited to a table. The light blocking object 86 and the reference object 80 may be placed on a floor or a shelf as long as its reflectance characteristics can similarly be determined. In any case, at the stage where a brightness distribution of incident light is acquired, information of incident light applied to a target can be estimated with accuracy, and the accuracy with which to acquire information of the target can be increased, by placing the reference object 80 in an environment as closely as possible to the target whose shape and material is to be acquired when the system is in operation. The entire process can be simplified by excluding, from the information to be acquired, a brightness distribution of incident light applied to a surface, such as a bottom surface, that is not necessary when the system is in operation.

In the illustrated set-up, the user changes the position and direction of a light inlet of the light blocking object 86 by removing one or more facets of the light blocking object 86 and putting them back again, and operates the image capturing device 12 to capture an image. Therefore, the light blocking object 86 is of a structure that allows the user to manually remove the facets thereof. By capturing images from a plurality of directions in respective light-blocked states, brightness distributions of emitted light can be acquired in a wide range, resulting in an increased accuracy with which to acquire a brightness distribution of incident light. The image capturing device 12 may be a video camera that captures a moving image in different directions, and the information processing apparatus 10 may select a target to be analyzed from obtained frames of the moving image.

The information processing apparatus 10 and the light blocking object 86 may be electrically connected to each other, and the information processing apparatus 10 may control the light blocking object 86 to shift its light inlet to a required position thereon. For example, the information processing apparatus 10 may selectively open and close shutters on the respective facets of the light blocking object 86. Alternatively, the facets of the light blocking object 86 may be formed by liquid crystal panels, and the information processing apparatus 10 may apply a voltage to those liquid crystal panels to change their crystal orientation, thereby enabling the facets of the light blocking object 86 to switch between a black state and a transparent state. The facets of the light blocking object 86 are not limited to the switching between the two tones, and may have their light transmittance switchable between three or more tones. The light transmittance of the light blocking object 86 may be gradually changed in its facets to achieve a gradation of brightness of incident light.

In the latter case, a value calculated by multiplying the original brightness of incident light by a known transmittance having an in-plane distribution represents the brightness of incident light applied to the reference object 80. By setting various transmittances and acquiring light emitted from the reference object 80, a number of equations can be established using images captured without changing the posture of the image capturing device 12. Moreover, the information processing apparatus 10 can control the image capturing timing and posture of the image capturing device 12. In this case, the information processing apparatus 10 may control the image capturing device 12 to capture an image at the time the light inlet is shifted to a required position or to capture images in a plurality of postures in each light-blocked state.

The light blocking object 86 is only required to have a plurality of flat or curved surfaces with a space defined therein, and may be either one of a spherical surface and cubic surfaces as described above, surfaces of a rectangular parallelepiped, polygonal surfaces, and a hollow cylindrical surface, and the like. The light inlet is not limited to any particular shape, and may be of a rectangular shape, a circular shape, a polygonal shape, a slit-like shape, or the like. Alternatively, as described later, the light blocking object 86 may be an object for blocking part of incident light, e.g., an object such as a user's hand or a plate to be moved by the user, a person or an animal passing nearby, or the like. In such a case, light can be applied from a whole range or all directions not obstructed by the object. According to the present embodiment, that range also represents a "light inlet" in a wide sense.

Figure 5:
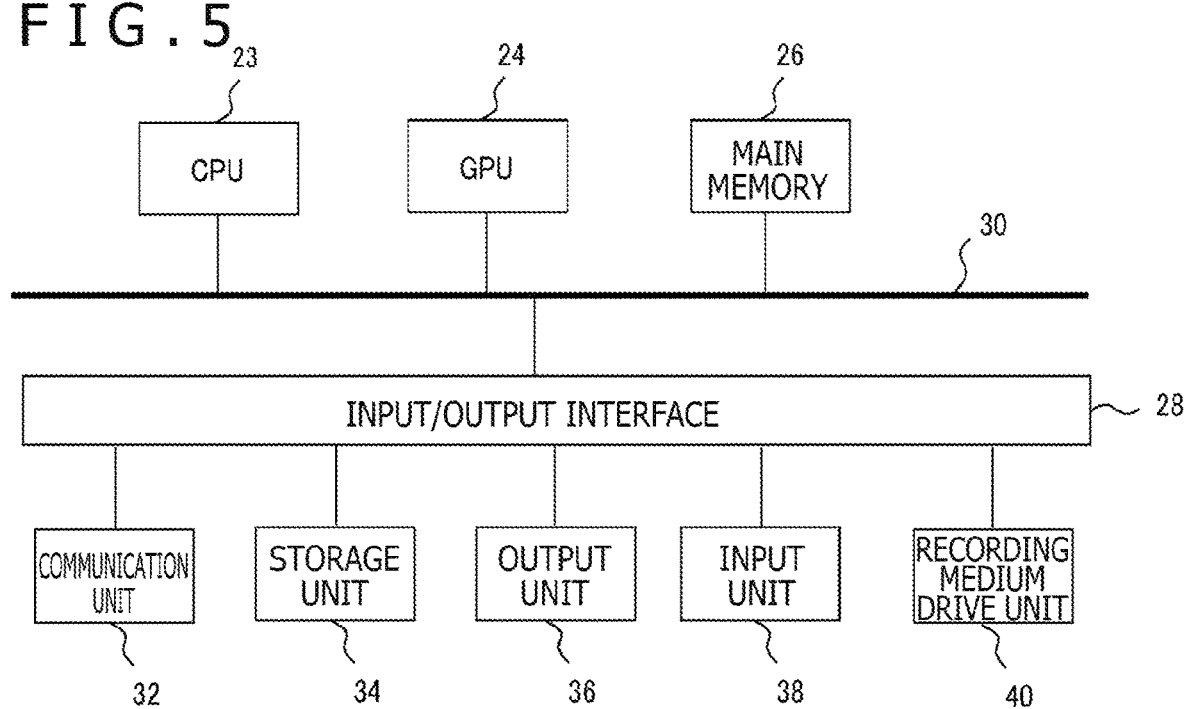
FIG. 5 is a diagram illustrating an internal circuit arrangement of an information processing apparatus according to the embodiment.

FIG. 5 illustrates an internal circuit arrangement of the information processing apparatus 10. The information processing apparatus 10 includes a central processing unit (CPU) 23, a graphics processing unit (GPU) 24, and a main memory 26. These components are interconnected by a bus 30. To the bus 30, there is also connected an input/output interface 28. The input/output interface 28 is connected to a peripheral device interface such as universal serial bus (USB) or IEEE1394 (IEEE: Institute of Electrical and Electronics Engineers), a communication unit 32 including a wired or wireless LAN network interface, a storage unit 34 such as a hard disk drive or a nonvolatile memory, an output unit 36 for outputting data to the display device 16 when necessary, an input unit 38 for entering data from the image capturing device 12 or an input device, not illustrated, and a recording medium drive unit 40 for driving a removable recording medium such as a magnetic disk, an optical disk, or a semiconductor memory.

The CPU 23 controls the information processing apparatus 10 in its entirety by executing an operating system stored in the storage unit 34. Moreover, the CPU 23 executes various programs read from the removable recording medium and loaded into the main memory 26 or downloaded through the communication unit 32. The GPU 24 has a function of a geometry engine and a function of a rendering processor and performs a rendering process according to a rendering command from the CPU 23 and stores the data of a display image in a frame buffer, not illustrated. The GPU 24 converts the display image stored in the frame buffer into a video signal and outputs the video signal to the output unit 36. The main memory 26 includes a random access memory (RAM) and stores programs and data necessary for processing sequences of the information processing apparatus 10.

Figure 6:
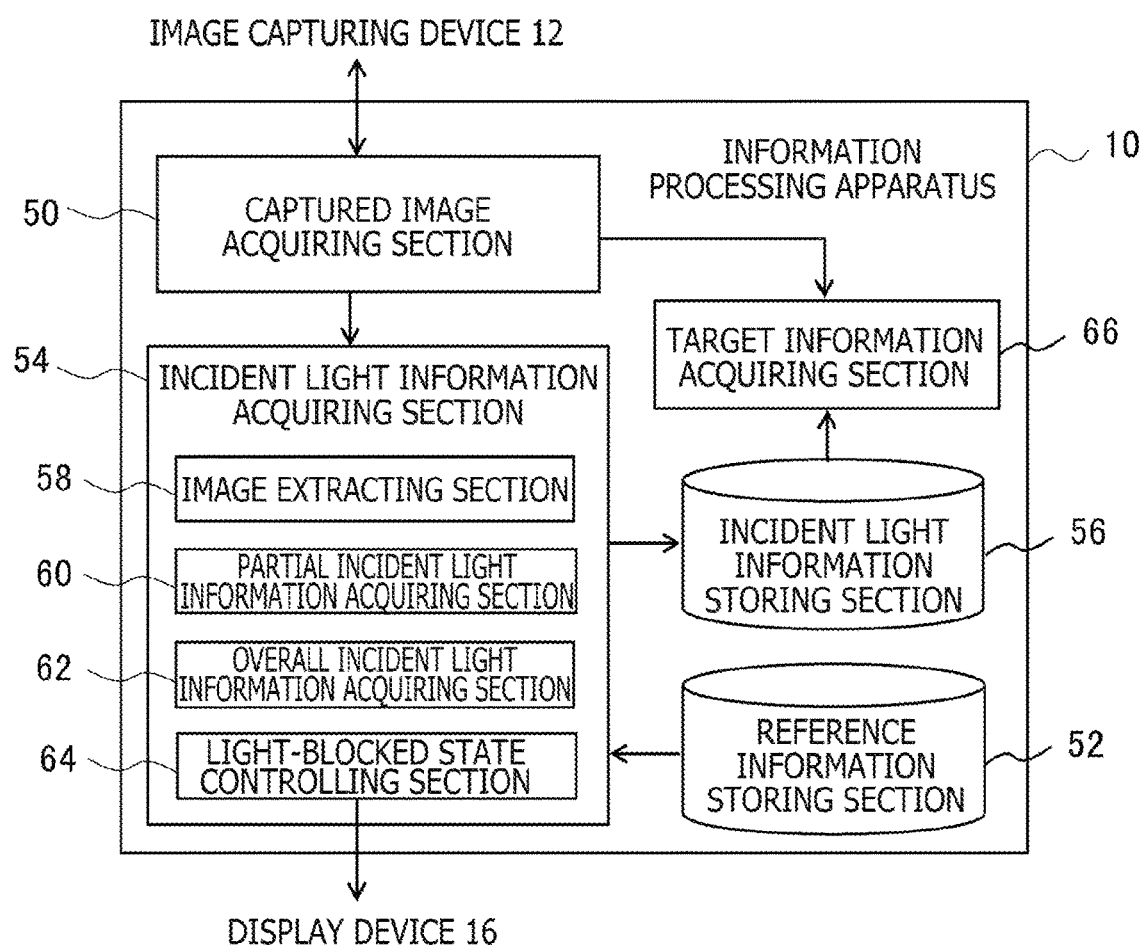
FIG. 6 is a diagram illustrating a functional block arrangement of the information processing apparatus according to the embodiment.

FIG. 6 illustrates a functional block arrangement of the information processing apparatus 10 according to the present embodiment. The information processing apparatus 10 includes a captured image acquiring section 50 for acquiring the data of a captured image from the image capturing device 12, the reference information storing section 52 for storing information regarding the shape and material of the reference object 80, the incident light information acquiring section 54 for acquiring information regarding a brightness distribution of incident light, an incident light information storing section 56 for storing the acquired information regarding the brightness distribution, and a target information acquiring section 66 for acquiring information regarding a target with use of the information regarding the brightness distribution.

The illustrated functional blocks include a function to acquire a brightness distribution of incident light with use of a captured image of a real reference object and a function to acquire information regarding a target with use of the acquired brightness distribution of incident light and a captured image of the target. If the information processing apparatus 10 is aimed at the acquisition of a brightness distribution of incident light, then the target information acquiring section 66 may be omitted. In a case where information regarding a target is also to be acquired, the target information acquiring section 66 functions by including the target in the subject illustrated in FIG. 1. In a case where a game is then to be performed using the target, the information processing apparatus 10 may include a function to perform an information processing sequence using the information regarding the target and to plot an image representing the result of the information processing sequence.

The illustrated functional blocks can be hardware-implemented by the CPU 23, the GPU 24, and the main memory 26 illustrated in FIG. 5, or can be software-implemented by computer programs read from a hard disk or a recording medium and loaded into the main memory 26. The functional blocks can thus be implemented by hardware only, software only, or a combination of hardware and software, as can be understood by those skilled in the art, and should not be limited to either one of those resources.

The captured image acquiring section 50 acquires the data of a captured image from the image capturing device 12. As described above, the captured image is an image captured of the reference object 80 while part of incident light applied thereto is being blocked. The captured image acquiring section 50 acquires the data of a plurality of images captured when incident light is blocked in different directions. The reference information storing section 52 stores in advance information regarding the shape and material of the reference object 80. In a case where a plurality of kinds of candidates for the reference object 80 are prepared, the reference information storing section 52 may store identifying information of those kinds and information regarding their shapes and materials in association with each other, so that the user can designate a reference object 80 to be used in reality among the stored kinds.

The incident light information acquiring section 54 includes an image extracting section 58, a partial incident light information acquiring section 60, an overall incident light information acquiring section 62, and a light-blocked state controlling section 64. The image extracting section 58 extracts an image of the reference object 80 from the captured image according to pattern matching or the like on the basis of features such as a shape and a color of the reference object 80 that have been acquired from the reference information storing section 52. The image extracting section 58 also acquires the posture of an image capturing plane with respect to the reference object 80 on the basis of the shape of the extracted image, the shape of an image of peripheral objects such as the table 88, and the like. The image extracting section 58 may acquire such information on the basis of a measured value from a motion sensor incorporated in the image capturing device 12.

The image extracting section 58 further acquires the position of the light inlet and the light-blocked state from the image of the light blocking object 86. The user may enter information regarding the position of the light inlet and the light-blocked state through the input device. Alternatively, the light-blocked state controlling section 64 may control the light inlet as described above. The partial incident light information acquiring section 60 acquires a brightness distribution of light emitted from the reference object 80 in a real space on the basis of the brightness distribution of the extracted image. Then, the partial incident light information acquiring section 60 estimates a brightness distribution of partial incident light in the light-blocked state where the image has been captured, according to the equation (3). At this time, the partial incident light information acquiring section 60 applies the information regarding the shape and material of the reference object 80 that has been acquired from the reference information storing section 52.

The overall incident light information acquiring section 62 acquires a brightness distribution of overall incident light in the absence of the light blocking object 86 by calculating brightness distributions of partial incident light according to the equation (4). However, various equations are available for acquiring a brightness distribution of overall incident light depending on how the light inlet is provided. Specifically, as illustrated in FIG. 3, a brightness distribution of incident light may be acquired after a brightness distribution of emitted light has been calculated. As described later, moreover, in a case where the ranges of light inlets in different light-blocked states overlap each other, brightness distributions are not simply added, but an overlapping area needs to be subtracted or divided.

The light-blocked state controlling section 64 controls the light inlet to be placed in a position where an image needs to be captured, depending on how the brightness distribution of partial incident light has been acquired. For example, if it is found that no distribution of incident light has been obtained from a certain facet of the light blocking object 86, then a notice is given to the user, advising the user to remove that face by way of image or sound. If an area where a brightness change is equal to or larger than a predetermined value is found, then a notice is given to the user, advising the user to reduce the opening range of the area. In this manner, brightness distributions of partial incident light are acquired in smaller units, increasing the accuracy of a brightness distribution of overall incident light.

Alternatively, as described above, the light-blocked state controlling section 64 may electrically control the light blocking object 86. In a case where the light blocking object 86 includes liquid crystal panels, the light-blocked state controlling section 64 may electrically control the light blocking object 86 to change the light transmittance thereof or form light transmitting stripes each having a predetermined minute width, thereby changing at least some facets of the light blocking object 86 to polarizers. This offers advantages same as those obtained if the image capturing device 12 is a polarization camera. The light-blocked state controlling section 64 may prompt the user to carry out a process of replacing some facets of the light blocking object 86 with polarizers. Furthermore, the light-blocked state controlling section 64 may prompt the user to block necessary directions depending on how a brightness distribution of partial incident light has been acquired.

The incident light information acquiring section 54 may perform its process similarly on a plurality of reference objects 80. In a case where no secondary reflection on the inner surface of the light blocking object 86 is taken into account, the brightness distribution of incident light basically does not depend on the material of the reference object 80. However, errors depending on the material and shape thereof could occur due to the secondary reflection or the like. Such errors can be minimized by acquiring brightness distributions of incident light with use of reference objects 80 of different shapes and materials and averaging the acquired brightness distributions of incident light into a final brightness distribution.

The incident light information acquiring section 54 stores the information of the acquired brightness distribution of overall incident light in the incident light information storing section 56. The target information acquiring section 66 acquires necessary information of the shape and material of a target on the basis of the stored brightness distribution of incident light and an image captured of the target. In this case, the captured image acquiring section acquires the data of the image captured of the target from image capturing device 12 and supplies the acquired data to the target information acquiring section 66. Although the present embodiment is not limited to any particular process of determining the shape and material of the target with use of the captured image, inverse rendering, for example, may be carried out according to the equation (1).

The reference object 80 and the light blocking object 86 may be disposed in the vicinity of the target, and their images may be captured at the same time, so that the incident light information acquiring section 54 can concurrently acquire a brightness distribution of incident light during a period in which the target information acquiring section 66 is functioning. For example, the target information acquiring section 66 may detect a change in the initially acquired brightness distribution of incident light on the basis of the image captured of the reference object during the period, and may correct the brightness distribution of incident light or acquire a brightness distribution of incident light again when necessary.

Figure 7:
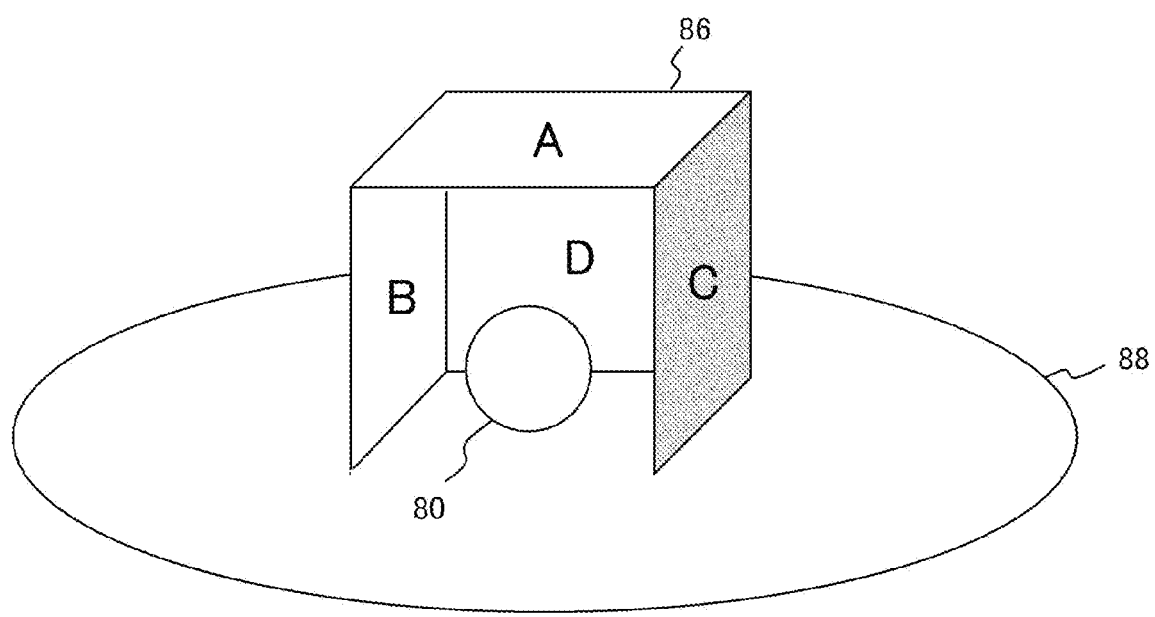
FIG. 7 is a diagram that is used to explain a light inlet of a light blocking object having a cubic shape according to the embodiment.

FIG. 7 is a diagram that is used to explain the light inlet of the light blocking object 86 that has a cubic shape. The light blocking object 86 is open for image capturing at all times in its facet that faces the viewer of FIG. 7. The light blocking object 86 has other facets A, B, C, and D that are capable of blocking light. When the light blocking object 86 is in a state (1) where plates are disposed on all of the four facets A, B, C, and D, then the partial incident light information acquiring section 60 obtains a brightness distribution $L_i(1)$ of incident light applied through the facet facing the viewer of FIG. 7. When the light blocking object 86 is in a state (2) where the upper facet A is free of the plate or is transparent so as to provide a light inlet in this facet, the partial incident light information acquiring section 60 obtains a brightness distribution $L_i(2)$ of incident light applied through the facet facing the viewer of FIG. 7 and also through the upper facet A.

Similarly, when the light blocking object 86 is in a state (3) where a light inlet is provided in the facet B, the partial incident light information acquiring section 60 obtains a brightness distribution $L_i(3)$ of incident light. When the light blocking object 86 is in a state (4) where a light inlet is provided in the facet C, the partial incident light information acquiring section 60 obtains a brightness distribution $L_i(4)$ of incident light. When the light blocking object 86 is in a state (5) where a light inlet is provided in the facet D, the partial incident light information acquiring section 60 obtains a brightness distribution $L_i(5)$ of incident light. Since the light blocking object 86 is open for image capturing at all times in its facet that faces the viewer of FIG. 7, as described above, the brightness distribution $L_i(1)$ is included in all the brightness distributions $L_i(2)$, $L_i(3)$, $L_i(4)$, and $L_i(5)$. The overall incident light information acquiring section 62 then determines a brightness distribution $L_i$ of overall incident light as follows.

$$L_i = L_i(2) + L_i(3) + L_i(4) + L_i(5) - 3L_i(1)$$

In this example, a light inlet is provided in one facet at a time of the cubic light blocking object 86. However, a light inlet may be provided simultaneously in two facets at a time. For example, when the light blocking object 86 is in a state (6) where a light inlet is provided in the facets A and B, the partial incident light information acquiring section 60 obtains a brightness distribution $L_i(6)$ of incident light. When the light blocking object 86 is in a state (7) where a light inlet is provided in the facets B and C, the partial incident light information acquiring section 60 obtains a brightness distribution $L_i(7)$ of incident light. When the light blocking object 86 is in a state (8) where a light inlet is provided in the facets C and D, the partial incident light information acquiring section 60 obtains a brightness distribution $L_i(8)$ of incident light. When the light blocking object 86 is in a state (9) where a light inlet is provided in the facets D and A, the partial incident light information acquiring section 60 obtains a brightness distribution $L_i(9)$ of incident light. The overall incident light information acquiring section 62 can thus calculate a brightness distribution $L_i$ of overall incident light as follows.

$$L_i = \{L_i(6) + L_i(7) + L_i(8) + L_i(9)\}/2 - L_i(1)$$

Figure 8:
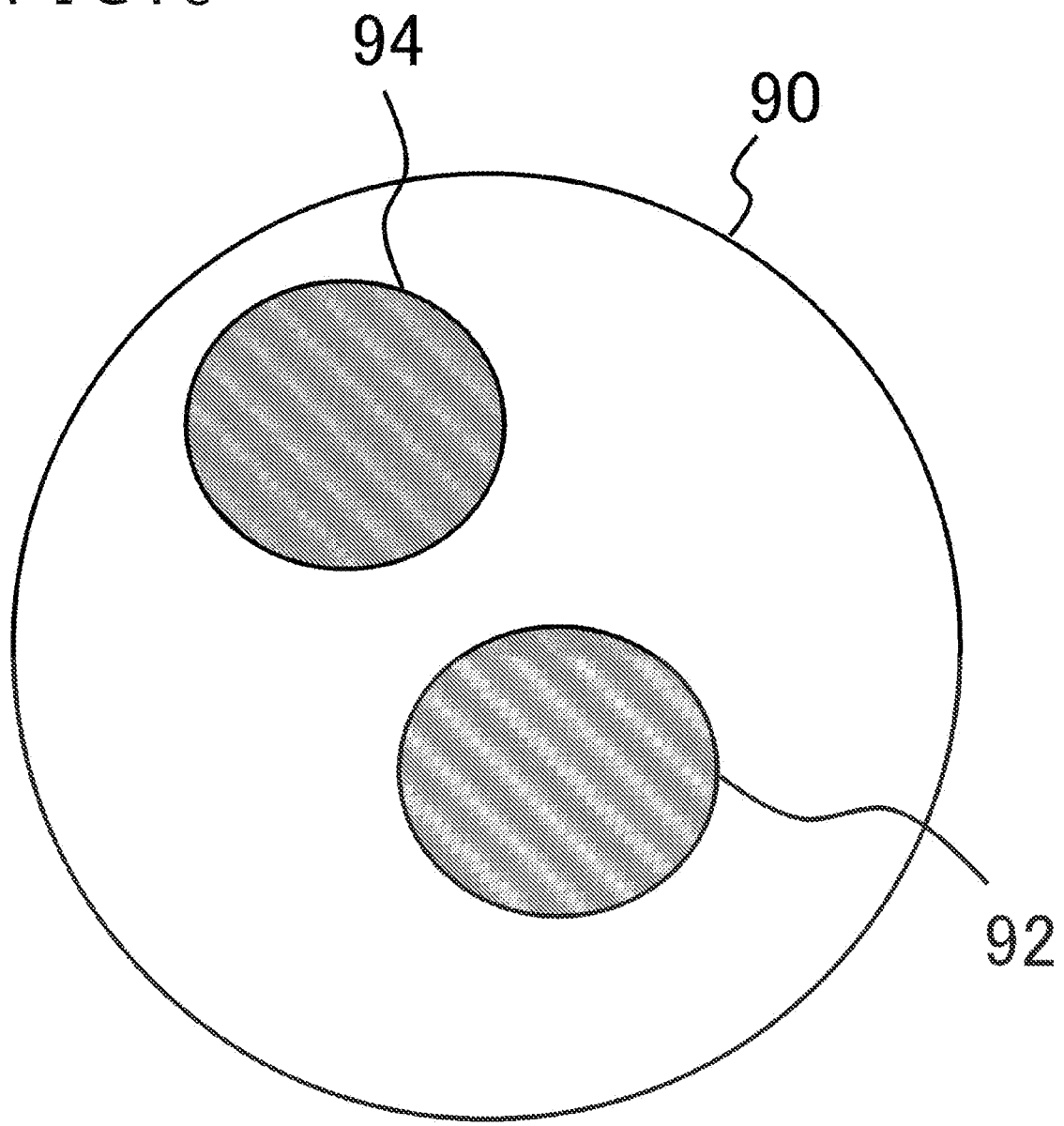
FIG. 8 is a diagram illustrating another example of a light blocking object according to the embodiment.

FIG. 8 illustrates another example of a light blocking object according to the present embodiment. The light blocking object, denoted by 90, is a spherical surface having an opening 92 for image capturing and a light inlet 94. The light blocking object 90 has an inner wall surface doubling as a reference object. In other words, the image capturing device 12 captures an image of at least part of the inner wall surface of the light blocking object 90 through the opening 92. The image capturing device 12 may be fitted in the opening 92, closing the opening 92. At any rate, the image capturing device 12 observes light emitted from the object to which incident light is applied through the light inlet 94, in the same manner as described above.

When the light blocking object 90 is turned, the orientation of the light inlet 94 changes, allowing brightness of partial incident light from various directions to be obtained, as is the case with a light inlet provided by removing a plate from a facet or making a facet transparent. In a case where the user rolls the light blocking object 90, a rotational angle sensor such as a rotary encoder may be incorporated in the light blocking object 90, for example, and the partial incident light information acquiring section 60 may acquire a measured angle from the rotational angle sensor via wireless communications, thereby acquiring the direction of the light inlet 94. Alternatively, the partial incident light information acquiring section 60 may acquire the direction of the light inlet 94 on the basis of a rotational angle of a frame of the captured image.

Further alternatively, the light blocking object 90 itself may have its own power source, and the light-blocked state controlling section 64 may control the power source to rotate the light blocking object 90. The light blocking object 90 may have one or more light inlets 94. The set of the light blocking object 86 and the reference object 80 as illustrated in FIG. 7 or the light blocking object 86 that doubles as the reference object as illustrated in FIG. 8 may be placed in the vicinity of a target when the system is in operation for playing a game, thereby monitoring a change in the brightness distribution of incident light.

In a case where incident light may possibly change over time due to an illumination whose illuminance gradually increases, changes in light from a window, or movements of a surrounding object, a brightness distribution of incident light that has been acquired in an initial process may be corrected whenever need arises to keep the accuracy with which to acquire the shape and material of a target. In this case, the incident light information acquiring section 54 periodically acquires a brightness distribution of incident light on the basis of the image of the reference object 80 and determines the difference between the presently acquired brightness distribution of incident light and the brightness distribution of incident light that has been acquired at a previous time, basically in the same procedure as described above.

At this time, the captured image that is used may be an image captured in order to acquire the shape and material of the target. In this case, variations of the posture of the image capturing device 12 and the light blocked state may possibly be more limited than with the captured image obtained in the initial process. The incident light information acquiring section 54 compares the results obtained under the limited conditions, and maintains the original information of incident light if it determines that the difference falls within a range of errors. Even if the difference is significant, the incident light information acquiring section 54 updates the brightness distribution in such a manner as to reflect only the results obtained under the limited conditions providing the difference is smaller than a predetermined standard. If the difference is equal to or larger than the predetermined standard, then the incident light information acquiring section 54 acquires a brightness distribution of overall incident light again under the same conditions as in the initial process.

On the premise that the incident light information acquiring section 54 finally acquires a brightness distribution of incident light again, the incident light information acquiring section 54 may indirectly detect a change in the brightness distribution of incident light on the basis of a change in the light emitted from the reference object 80, instead of keeping on acquiring a brightness distribution of incident light in a rigorous manner. Alternatively, the incident light information acquiring section 54 may keep on acquiring a brightness distribution of incident light at all times while the system is in operation by continuously rolling or flying in the air the light blocking object 86 that doubles as the reference object as illustrated in FIG. 8 under the control of the light-blocked state controlling section 64. Further alternatively, when a person or an animal passes in the vicinity of the reference object 80 while the system is in operation, the incident light information acquiring section 54 may regard the person or the animal as a light blocking object.

Specifically, as described above with reference to FIG. 3, the difference between rays of light emitted from the reference object 80 before and after the incident light is blocked by the person or the animal represents a contribution of incident light in the blocked direction. Therefore, the partial incident light information acquiring section 60 acquires a brightness distribution $L_i$ of incident light in the blocked direction from the difference between the rays of emitted light before and after the incident light is blocked, according to the equations (2) and (3). The partial incident light information acquiring section 60 performs the partial or overall correction as described above on the basis of the difference between the brightness distribution of the partial incident light and the brightness distribution of the partial incident light amid the brightness distribution of the overall incident light stored in the incident light information storing section 56.

Figure 9:
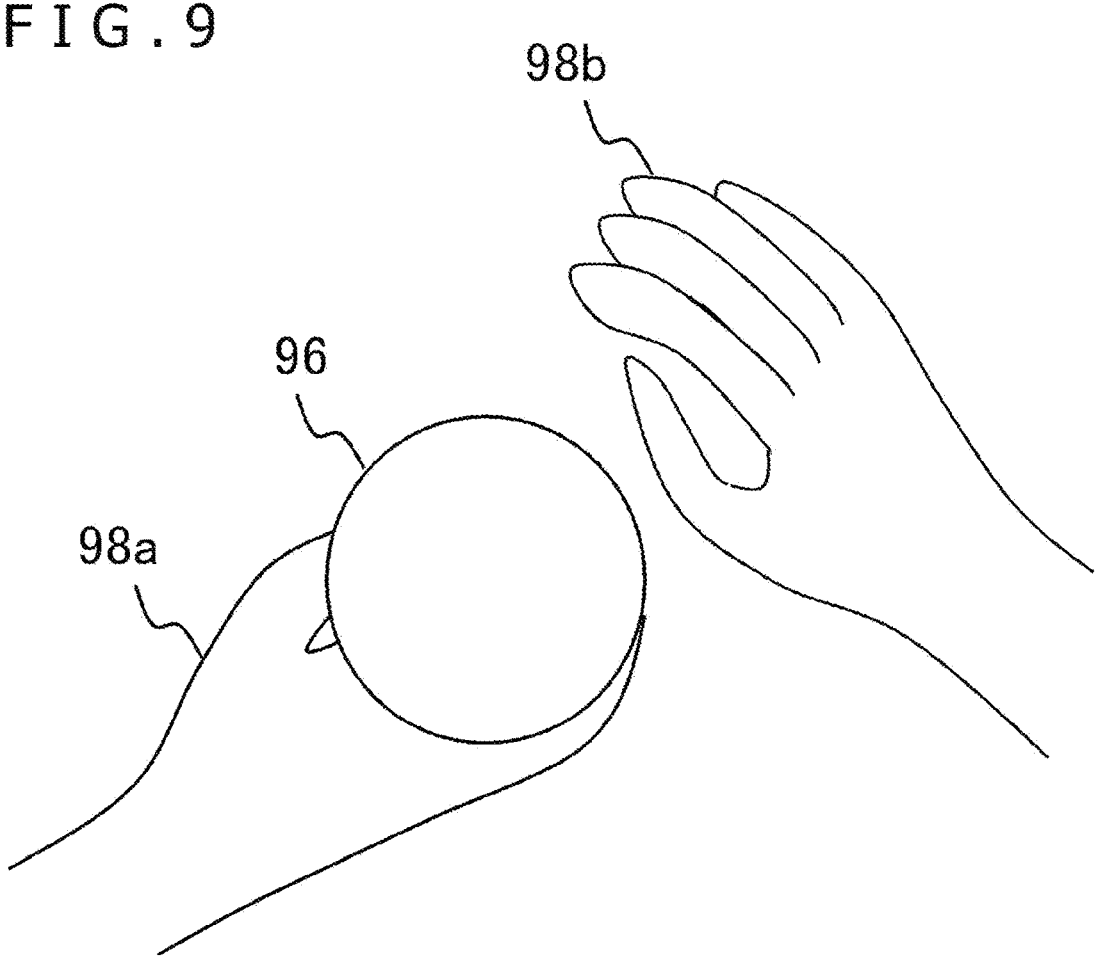
FIG. 9 is a diagram that is used to explain a mode for acquiring an incident light brightness distribution with a human hand used as a light blocking object according to the embodiment.

FIG. 9 is a diagram that is used to explain a mode for acquiring an incident light brightness distribution with a human hand used as a light blocking object. In the illustrated example, a reference object 96 is gripped by a hand 98a whereas incident light is blocked by another hand 98b. In this case, a brightness distribution of incident light from the direction of the hand 98b can be obtained on the basis of a change caused in light emitted from the reference object 96 when the incident light is blocked. Therefore, the information processing apparatus 10 can acquire a brightness distribution of overall incident light in the same manner as described above by acquiring images captured when the direction of the hand 98a with respect to the reference object 96 is changed in various ways.

At this time, the partial incident light information acquiring section 60 acquires the position and posture of the hand 98b that is blocking incident light, from a captured image according to pattern matching or the like. An object used to block incident light is not limited to a human hand, but may be a plate or the like. In this example, a human gripping the reference object 96 can create an environment similar to the environment where a target is used as a controller. In a case where a brightness distribution of incident light is acquired in preprocessing for obtaining the features or skin state of a human face when the system is in operation, the reference object 96 can freely be brought to match a height or position assumed by a target, such as the height of the face.

The same advantages as described above can be achieved when the light blocking objects and the reference objects illustrated in FIGS. 7 and 8 are gripped by a person. In the case where a human face is used as a target as mentioned above, since reflections from the shoulders and chest of the person could be applied as incident light, a reference object similar in shape to a human bust should preferably be prepared to realize a situation suitable for the system in operation.

Figure 10:
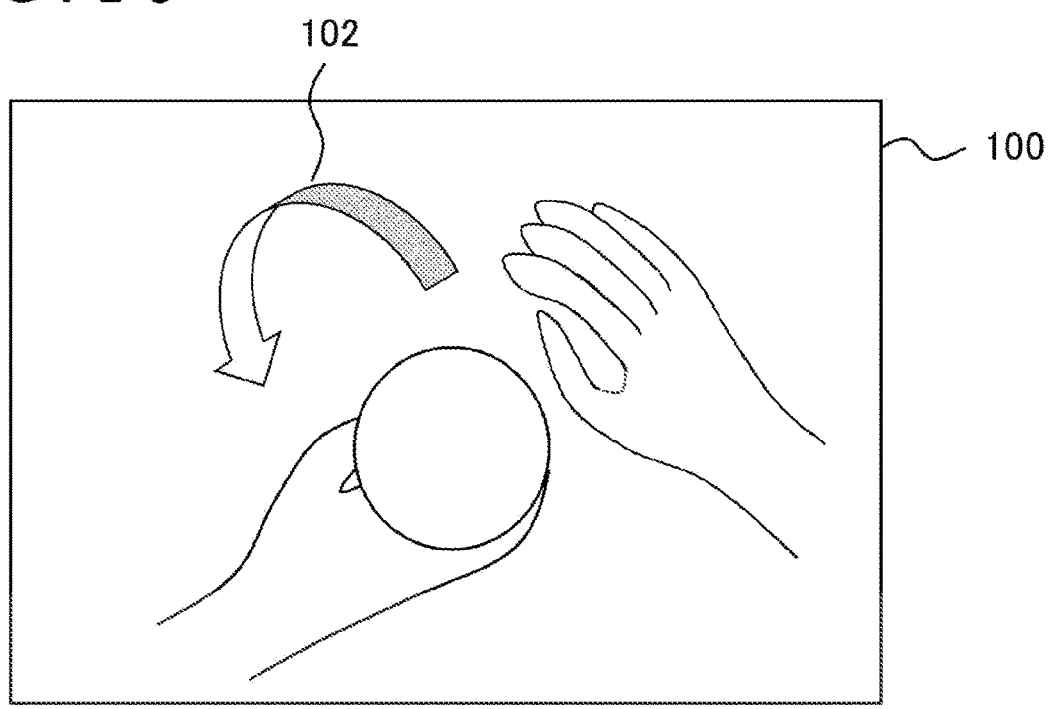
FIG. 10 is a diagram illustrating an example of a display screen at the time a light blocking state controller according to the embodiment indicates to the user a direction in which to block incident light.

FIG. 10 is a diagram illustrating an example of a display screen at the time the light-blocked state controlling section 64 indicates to the user a direction in which to block incident light. In this example, a light-blocked state guidance screen 100 as the display screen displays an image representing a present state and an arrow 102 superposed on the image to indicate a direction in which to block incident light. The image representing the present state may be an image captured of the state illustrated in FIG. 9 with the image capturing device 12 or an image reconstructed from the image as representing a state viewed by the user.

As described above, the partial incident light information acquiring section 60 acquires a direction in which to block incident light on the basis of an image of a hand or object that is blocking incident light in an image captured of a target to be analyzed. The light-blocked state controlling section 64 refers to the information of the acquired direction, the brightness distributions of incident light in the respective light-blocked states, or the status in progress of a brightness distribution of overall incident light calculated from the brightness distributions of incident light, and indicates a direction to be blocked for fresh image capturing to the user. For example, the light-blocked state controlling section 64 specifies a direction in which no brightness distribution has been obtained, a direction in which a large error such as distribution discontinuities is determined, a direction in which there is determined a large change in a brightness distribution, requiring the brightness distribution to be acquired in smaller units, or the like.

If the target information acquiring section 66 is in the process of acquiring the shape and material of a target, then the light-blocked state controlling section 64 may acquire the direction of incident light toward an area of the target where information needs to be acquired in more detail. Then, the light-blocked state controlling section 64 may derive a direction to be blocked in order to obtain a brightness distribution of incident light in the acquired direction, and plots the arrow 102 for moving the hand for blocking incident light in the derived direction on the display image. Various relations are available between the direction of incident light that needs additional information and the direction to be blocked, depending on the brightness distributions of partial incident light obtained so far.

In the example illustrated in FIG. 10, incident light is blocked by a human hand. However, a direction where a light inlet is provided on a light blocking object may be indicated by an arrow. When it is determined in a captured image that the user has blocked incident light or a light inlet has been provided according to the arrow, the partial incident light information acquiring section 60 acquires a brightness distribution of partial incident light from an image captured in that state. Then, the overall incident light information acquiring section 62 accurately determines a brightness distribution of overall incident light from calculations including brightness distributions of partial incident light that have been additionally acquired.

Operation of the information processing apparatus 10 that is realized by the configurations described above will be described below. FIG. 11 is a flowchart illustrating a processing sequence in which the information processing apparatus 10 acquires a brightness distribution of incident light. The processing sequence illustrated in FIG. 11 also includes a process of acquiring the information of a target with use of an acquired brightness distribution of incident light. The flowchart begins when the user prepares a reference object where part of incident light applied thereto is blocked and the image capturing device 12 captures an image of the reference object.

The captured image acquiring section 50 acquires the data of an image captured in a prepared light-blocked state from the image capturing device 12 (S10). Then, the incident light information acquiring section 54 acquires a brightness distribution of partial incident light in the light-blocked state on the basis of the image of a reference object in the captured image (S12). At this time, the incident light information acquiring section 54 acquires from the captured image or the like the direction in which incident light is blocked or the direction of a light inlet. The incident light information acquiring section 54 calculates a brightness distribution of overall incident light in the range of obtained information from calculations including brightness distributions of partial incident light (S14). However, the processing of S14 is omitted in a first cycle of the processing sequence.

If not all brightness distributions of partial incident light in necessary directions have been obtained (N in S16), the incident light information acquiring section 54 indicates a light-blocked state necessary to obtain lacking information, i.e., a direction in which to block incident light or a direction of the light inlet, to the user through the display device 16 (S18). However, the information processing apparatus 10 may electrically control a light blocking object to create a necessary light-blocked state. The captured image acquiring section 50 acquires the data of a captured image in a new light-blocked state, and the incident light information acquiring section 54 acquires a brightness distribution in the light-blocked state and calculates a brightness distribution of overall incident light in the range of obtained information (S10 through S14).

The processing of S10 through S18 is repeated until all brightness distributions of partial incident light in necessary directions are obtained (Y in S16), whereupon the incident light information acquiring section 54 stores the information of the brightness distribution of overall incident light acquired at the time in the target information acquiring section 66 (S20). Then, the target information acquiring section 66 starts acquiring the shape and material of a target by using the information of the brightness distribution (S22). Strictly speaking, the processing of S22 includes a process in which the captured image acquiring section 50 acquires the image captured of the target from the image capturing device 12.

In this stage, too, the incident light information acquiring section 54 monitors a change in the brightness distribution of incident light on the basis of the image of the reference object in the captured image (N of S24, S26). If there is a change equal to or larger than a predetermined standard in the brightness distribution during a period in which the information of the target is being acquired (N of S24, Y of S26), then the incident light information acquiring section 54 carries out the processing of S10 through S18 again to acquire a brightness distribution of overall incident light again (S20). As described above, rather than performing the processing of S10 through S18, the incident light information acquiring section 54 may make a small-scale correction to reflect the brightness distribution of partial incident light obtained by the monitoring process in S26.

If there is not a change equal to or larger than the predetermined standard in the brightness distribution, the acquisition of the information of the target is continued (N of S26, S22). In this manner, the information of the target is acquired while correcting the brightness distribution of incident light whenever need arises. The processing sequence illustrated in FIG. 11 comes to an end when the acquisition of the information of the target is completed (Y of S24).

According to the present embodiment as described above, a brightness distribution of incident light that is required for acquiring the shape and material of a target with use of a captured image is acquired using an image captured of a three-dimensional reference object at the same site. By capturing an image while blocking part of incident light, the degree of freedom of the brightness distribution is limited, making it easy to derive a solution to an equation representing a reflective model. A brightness distribution of overall incident light can easily and accurately be derived from calculations including brightness distributions of partial incident light thus obtained.

Inasmuch as part of incident light is blocked, a general user finds it easy to create a necessary light-blocked state by introducing a light blocking object whose light inlet is positionally variable or indicating a necessary direction in which to block incident light to the user. Moreover, since an image of the reference object can easily be captured in the same situation as with the target whose shape and material is to be acquired, the information of the target can be acquired with accuracy, and the accuracy of information processing that uses the information of the target can easily be increased.

The present invention has been described above on the basis of the preferred embodiment thereof. The embodiment described above is by way of illustrative example only, and it is obvious to those skilled in the art that the various components of the embodiment and the combination of the processing processes may be modified in various ways and such modifications may fall within the scope of the invention.

REFERENCE SIGNS LIST

10: Information processing apparatus
12: Image capturing device
16: Display device
23: CPU
24: GPU
26: Main memory
50: Captured image acquiring section
52: Reference information storing section
54: Incident light information acquiring section
56: Incident light information storing section
58: Image extracting section
60: Partial incident light information acquiring section
62: Overall incident light information acquiring section
64: Light-blocked state controlling section
66: Target information acquiring section

INDUSTRIAL APPLICABILITY

As described above, the present invention is applicable to any of various information processing apparatuses including an image processing apparatus, a game apparatus, a mobile terminal, a personal computer, and the like, and a system including them.

The invention claimed is:

1. An incident light information acquiring method comprising:
acquiring an image captured of a reference object whose shape and material are known while part of incident light applied thereto is being blocked;
acquiring, according to a predetermined model equation, a brightness distribution of partial incident light produced by blocking part of the incident light, on a basis of the image of the reference object in each of a plurality of images captured when the incident light is blocked in different directions; and
acquiring a brightness distribution of overall incident light by calculating brightness distributions of partial incident light.

2. The incident light information acquiring method according to claim 1, wherein the acquiring an image includes
acquiring an image captured of the reference object that is disposed in an internal space in a light blocking object having a positionally variable light inlet.

3. The incident light information acquiring method according to claim 2, further comprising:
controlling the light blocking object to place the light inlet in a position where an image needs to be captured, depending on how the brightness distribution of partial incident light has been acquired.

4. The incident light information acquiring method according to claim 3, wherein the controlling includes
changing the position of the light inlet by partially changing a light transmittance of a liquid crystal panel as the light blocking object by controlling a voltage applied to the light crystal panel.

5. The incident light information acquiring method according to claim 3, wherein the controlling includes
changing at least a facet of the light blocking object to a polarizer by controlling a liquid crystal panel as the light blocking object to form light transmitting stripes each having a predetermined width.

6. The incident light information acquiring method according to claim 1, wherein the acquiring an image includes
acquiring an image captured of an inner wall surface of a light blocking object having a positionally variable light inlet, as the image of the reference object.

7. The incident light information acquiring method according to claim 6, wherein the acquiring an image includes
acquiring a plurality of images of the inner wall surface of the light blocking object with the light inlet facing in different directions by rotating the light blocking object.

8. The incident light information acquiring method according to claim 1, further comprising:
acquiring a direction in which the incident light is blocked on a basis of an image of an object that is blocking the incident light in the captured image; and
indicating to a user a direction in which to block the incident light and where an image needs to be captured, depending on how the brightness distribution of partial incident light has been acquired.

9. The incident light information acquiring method according to claim 1, further comprising:
detecting a change in the brightness distribution of incident light on a basis of an image captured of the reference object during a period in which at least either one of a shape and a material of a target included in the captured image is acquired, on a basis of the brightness distribution of incident light; and
correcting information of the brightness distribution of incident light depending on the change in the brightness distribution.

10. The incident light information acquiring method according to claim 1,
wherein the acquiring an image includes
acquiring polarized images in a plurality of directions, and
wherein the acquiring a brightness distribution of partial incident light includes
acquiring brightness distributions of partial incident light in the respective directions in which the polarized images are acquired and adding the acquired brightness distributions of partial incident light to acquire the brightness distribution of partial incident light.

11. The incident light information acquiring method according to claim 2, further comprising:
turning on a light source on an inner wall surface of the light blocking object, acquiring reflective characteristics of a surface on which the light blocking object is placed on a basis of an image of the surface in a captured image free of the reference object, and reflecting the acquired reflective characteristics in the model equation.

12. The incident light information acquiring method according to claim 1, wherein the acquiring a brightness distribution of partial incident light includes
calculating brightness distributions of light emitted from the reference object that are obtained on the basis of images of the reference object in a plurality of directions in which incident light is blocked, to thereby calculate a brightness distribution of light emitted from the reference object in a direction in which incident light is blocked and where no image is captured, and acquiring a brightness distribution of partial incident light on a basis of the calculated brightness distribution of emitted light.

13. An incident light information acquiring system comprising:
a reference object whose shape and material are known;
an image capturing device that captures an image of the reference object while part of incident light applied thereto is being blocked; and
an information processing apparatus that acquires a brightness distribution of incident light by using the captured image,
wherein the information processing apparatus includes
a partial incident light information acquiring section that acquires, according to a predetermined model equation, a brightness distribution of partial incident light produced by blocking part of the incident light, on a basis of the image of the reference object in each of a plurality of images captured when the incident light is blocked in different directions, and
an overall incident light information acquiring section that acquires a brightness distribution of overall incident light by calculating brightness distributions of partial incident light.

14. An information processing apparatus comprising:
a captured image acquiring section that acquires an image captured of a reference object whose shape and material are known while part of incident light applied thereto is being blocked;
a partial incident light information acquiring section that acquires, according to a predetermined model equation, a brightness distribution of partial incident light produced by blocking part of the incident light, on a basis of the image of the reference object in each of a plurality of images captured when the incident light is blocked in different directions; and an overall incident light information acquiring section that acquires a brightness distribution of overall incident light by calculating brightness distributions of partial incident light.

15. A non-transitory, computer readable storage medium containing a computer program, which when executed by a computer, causes the computer to perform an incident light information acquiring method by carrying out actions, comprising:

acquiring an image captured of a reference object whose shape and material are known while part of incident light applied thereto is being blocked;

acquiring, according to a predetermined model equation, a brightness distribution of partial incident light produced by blocking part of the incident light, on a basis of the image of the reference object in each of a plurality of images captured when the incident light is blocked in different directions; and acquiring a brightness distribution of overall incident light by calculating brightness distributions of partial incident light.

* * * * *